(12) United States Patent
Hausmann et al.

(10) Patent No.: US 8,418,498 B2
(45) Date of Patent: Apr. 16, 2013

(54) REFRIGERATION DEVICE AND METHOD FOR CONTROLLING A REFRIGERATION DEVICE

(75) Inventors: Georg Hausmann, Blindheim (DE); Hans Ihle, Giengen (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 792 days.

(21) Appl. No.: 12/516,655

(22) PCT Filed: Dec. 12, 2007

(86) PCT No.: PCT/EP2007/063754
§ 371 (c)(1),
(2), (4) Date: Dec. 14, 2009

(87) PCT Pub. No.: WO2008/077778
PCT Pub. Date: Jul. 3, 2008

(65) Prior Publication Data
US 2010/0083688 A1    Apr. 8, 2010

(30) Foreign Application Priority Data
Dec. 22, 2006   (DE) .................... 10 2006 061 160

(51) Int. Cl.
F25D 11/02   (2006.01)
F25B 41/04   (2006.01)
F25B 1/10    (2006.01)
F04B 23/04   (2006.01)

(52) U.S. Cl.
USPC ............. 62/441; 62/216; 62/510; 417/426

(58) Field of Classification Search .......... 62/441, 62/498, 510, 215, 216; 700/275
See application file for complete search history.

(56) References Cited

U.S. PATENT DOCUMENTS
2,274,336 A    2/1942   Lammers, Jr.

FOREIGN PATENT DOCUMENTS
| EP | 0192526 A1 | 8/1986 |
| FR | 2617581 | 1/1989 |
| JP | 6003015 A | 1/1994 |
| JP | 2005106454 A | 4/2005 |

*Primary Examiner* — Chen Wen Jiang
(74) *Attorney, Agent, or Firm* — James E. Howard; Andre Pallapies

(57) ABSTRACT

A refrigeration device includes an interior that is divided up into two refrigeration zones with each refrigeration zone having an evaporator and a compressor for supplying the evaporator with a refrigerant. A control for operating the compressors can be operated in different modes of operation depending on predetermined conditions. In a normal mode, the at least two compressors are exclusively operated at different times.

20 Claims, 1 Drawing Sheet

REFRIGERATION DEVICE AND METHOD FOR CONTROLLING A REFRIGERATION DEVICE

BACKGROUND OF THE INVENTION

The present invention relates to a refrigeration appliance and a method for controlling a refrigeration appliance.

Refrigeration appliances have become known, which have two separate refrigerant circuits with a compressor, evaporator and condenser. The interior of such refrigeration appliances is generally divided into two refrigeration zones, configured as a freezer compartment and a refrigerator compartment. One of the two evaporators is provided in each refrigeration zone.

A controller uses temperature sensors in the two refrigeration zones to determine the temperatures prevailing there. If the temperatures rise above the respectively preset maximum temperature, the controller starts up the respective compressor in order to be able to discharge heat from the refrigeration zone in question by way of the refrigerant. If the preset maximum temperature is reached at a similar time in both refrigeration zones, both compressors are activated so that they operate simultaneously for a specific time period at least. This frequently produces disruptive vibration. Also when two compressors are operating simultaneously, the noise reaches a level that is frequently perceived as too loud.

BRIEF SUMMARY OF THE INVENTION

The object of the invention is to embody a refrigeration appliance and a method for controlling a refrigeration appliance in such a manner that the two compressors only operate simultaneously in exceptional situations, being operated in principle at different times in normal conditions.

According to the invention the object is achieved by a refrigeration appliance with the features of claim 1 and a method for controlling a refrigeration appliance with the features of claim 8. Because the controller can be operated in different operating modes as a function of predetermined conditions, it is possible for the controller also to respond differently to different conditions. Thus according to the invention provision is made for a normal mode, in which the controller only operates the compressors at different times. Simultaneous operation of both compressors can thus be excluded under normal conditions. However the controller is still able to operate both compressors together in extraordinary conditions, in other words in an exceptional case. It is thus possible to prevent the temperature in the refrigeration zones rising too high in extraordinary circumstances, thereby damaging the stored goods. The significant vibration and high noise level resulting when two compressors operate simultaneously are however avoided under normal conditions.

One refrigerant circuit is equipped with a compressor and evaporator for a freezer compartment and the other refrigerant circuit is equipped with a compressor and evaporator for a refrigerator compartment. A shared condenser could be provided for both refrigerant circuits. In one exemplary embodiment of the invention however both refrigerant circuits are provided with their own condenser.

A temperature sensor is provided in both the freezer compartment and in the refrigerator compartment. The controller is connected to both sensors and is therefore able to determine the temperature prevailing in the freezer compartment and/or refrigerator compartment at any time. The temperature sensors are generally attached directly to the evaporator and measure the temperature of the refrigerant. It is also possible to conclude the temperature in the freezer and/or refrigerator compartment by way of this measurement. In one advantageous exemplary embodiment of the invention the controller is connected to a sensor for capturing the external temperature. In this exemplary embodiment the external temperature represents one of the predetermined conditions, of which the operating mode, in which the controller is operated, is a function. It can for example be set for the controller to switch out of normal mode as soon as the external temperature exceeds 30° C. With an external temperature of this magnitude it can happen that the internal temperature in the freezer and/or refrigerator compartment rises so quickly that the permissible maximum temperature is reached, before the low temperature required to deactivate the compressor is reached in the respective other compartment. In such extraordinary conditions the invention allows the controller to switch to another mode and exceptionally to permit parallel operation of the two compressors.

Such extraordinary circumstances are not only a function of the external temperature however. Extraordinary circumstances similarly occur when a large quantity of warm goods is introduced at once. Such circumstances can also occur, when a layer of ice forms on the evaporators, having an adverse effect on the transfer of heat to the refrigerant. In all these instances the extraordinary circumstances may mean that the compressors would each have to operate for a very long time period in order to be able to restore the respectively required temperature in the refrigeration zone. Assuming normal conditions, each compressor operates in a specific operating cycle. For example in one cycle the compressor operates for a period of 20% of the cycle time and is deactivated for the remaining 80% of the cycle time. The time interval in which the compressor operates is referred to as the relative activation period. If we now assume that in a refrigeration appliance with two compressors each of the compressors operates for 20% of the cycle time, this gives a relative activation period of 40% in normal conditions when the compressors are not operated simultaneously but one after the other.

If extraordinary circumstances then occur, the relative activation period increases. This is possible until the relative activation period reaches 100%. If the compressors would have to be operated even longer to reach the required temperature in the refrigeration zones, it is no longer possible to operate the two compressors at different times. According to the invention the controller then switches out of normal mode to another operating mode. In this other operating mode the simultaneous operation of both compressors is exceptionally permitted. This measure ensures that the refrigeration appliance is operated with as little vibration and as low a noise level as possible, whilst still ensuring that the necessary temperature is reached in the refrigeration zones even in exceptional situations and no goods can be spoiled.

Refrigeration appliances are now frequently fitted with an automatic defrost mechanism. The defrost operation is started when the layer of ice on the compressor reaches a certain thickness. This is determined in a number of ways and is not relevant to the invention. So that the corresponding refrigeration zone is not heated significantly during the defrost operation, the evaporator is generally provided in a separate chamber, with an exchange of air taking place by way of a fan between the evaporator chamber and the refrigeration zone. During the defrost operation the fan is deactivated so that there is no exchange of air between the evaporator chamber and the refrigeration zone during this time. Also the evaporator is heated during the defrost operation, so that the ice melts. The defrost time is a function of the thickness of the ice layer.

The defrost operation can also result in extraordinary conditions. If the defrost time exceeds the normal deactivation time of the compressor, the temperature in the relevant refrigeration zone rises above the temperature at which the controller would have to restart the compressor, until normal conditions are once again restored.

In one particularly advantageous exemplary embodiment of the method for controlling the refrigeration appliance one refrigeration zone is prioritized. The prioritized refrigeration zone is generally the freezer compartment. If a need for refrigeration occurs simultaneously in both refrigeration zones, in other words the temperature at which the controller starts the compressor up is reached roughly simultaneously in both refrigeration zones, the controller starts the compressor responsible for the freezer compartment first. This prevents goods stored in the freezer compartment from thawing and thus being damaged. Instead the temperature in the refrigerator compartment is briefly allowed to rise above the set temperature. However the goods here are not damaged as a result of this only brief temperature increase.

However to ensure that the temperature in the refrigerator compartment does not rise too much, provision is made for a maximum changeover time, for which the compressor of the freezer compartment is operated. Even if the temperature in the freezer compartment has not reached the deactivation temperature for the compressor in this maximum changeover time, the compressor for the freezer compartment is deactivated and the compressor for the refrigerator compartment is activated. This compressor is also now activated only for the maximum changeover time. After this there is a switch back to the compressor for the freezer compartment. In normal conditions a state is thus slowly reached, in which the refrigeration requirement for the freezer compartment and the refrigeration requirement for the refrigerator compartment occur one after the other.

BRIEF DESCRIPTION OF THE DRAWINGS

Further details and advantages of the invention will emerge from the subclaims in conjunction with the description of exemplary embodiments, which are described in detail with reference to the drawings, in which:

DETAILED DESCRIPTION OF THE PRESENT INVENTION

Figure 1:
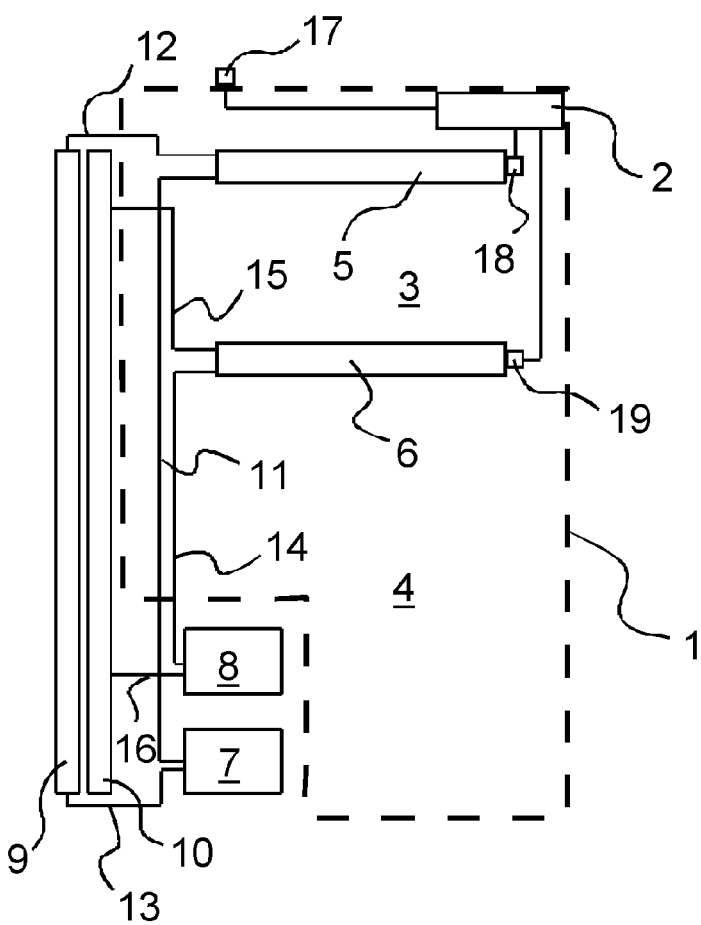
FIG. 1 shows a schematic diagram of a fridge-freezer and
FIG. 2 shows different diagrams of compressor cycles.

The fridge-freezer 1 shown in FIG. 1 has a freezer compartment 3 and a refrigerator compartment 4. A dedicated refrigerant circuit is assigned respectively in both refrigeration zones 3, 4. The freezer compartment evaporator 5 is supplied with refrigerant from the freezer compartment condenser 9 by way of the line 12. The heated refrigerant is fed to the freezer compartment compressor by way of the line 12 and finally flows back into the freezer compartment condenser by way of the line 13. A corresponding refrigerant circuit for the refrigerator compartment 4 includes the line 15 to the refrigerator compartment evaporator, in the refrigerator compartment evaporator 6, the line 14 to the refrigerator compartment compressor, the refrigerator compartment compressor 8, the line 16 to the refrigerator compartment condenser, and the refrigerator compartment condenser 10.

The controller 2 is provided to control the freezer compartment compressor 7 and the refrigerator compartment compressor 8. The freezer compartment or refrigerator compartment temperature is regulated by way of the temperature determined by the freezer compartment sensor 18 or the refrigerator compartment sensor 19. So that it is also possible to take account of the external temperature when controlling the fridge-freezer 1, the external sensor 17 is also connected to the controller 2.

Figure 2:
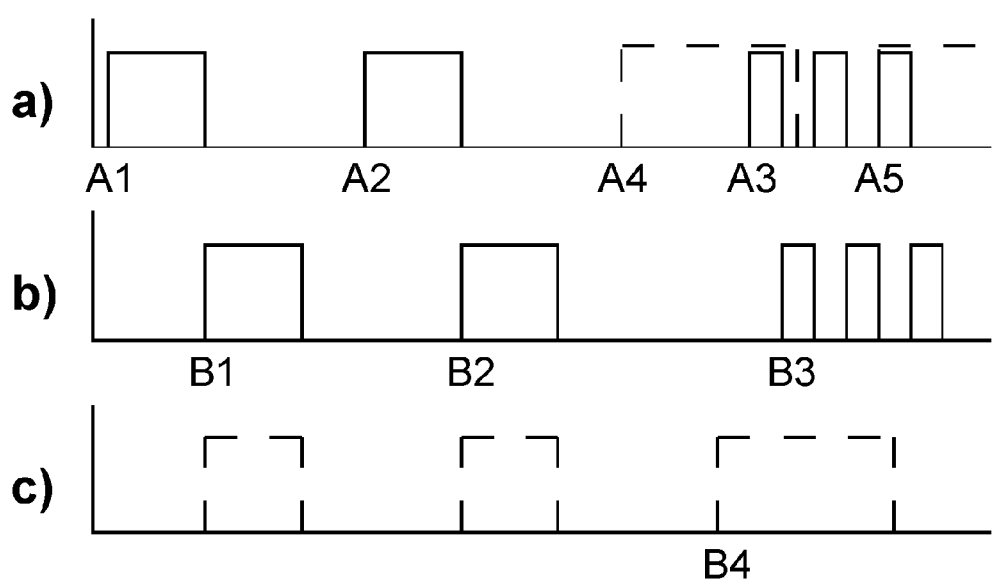

FIG. 2 shows different compressor cycles, which are to be used to describe the invention further. FIG. 2 a) shows the compressor cycle of the freezer compartment compressor 7 for a first exemplary sequence with a continuous line. FIG. 2 b) shows the associated compressor cycle of the refrigerator compartment compressor 8. A complete compressor cycle starts at time A1 and ends at time A2. The controller is operated in normal mode at this time. The cycle time A1/A2 is dimensioned such that the runtime of the freezer compartment compressor 7 added to the runtime of the refrigerator compartment compressor 8 is in any case shorter than the cycle time A1/A2. According to the invention the prioritized freezer compartment compressor 7 starts up first in this normal mode. This is deactivated again after the specified runtime. The refrigerator compartment compressor 8 only starts up at time B1, which is either the same as the end of the runtime of the freezer compartment compressor 7 or is shortly after it. This ensures that both compressors 7, 8 are not operated together but one after the other in normal operating mode of the controller. This measure reduces the noise and vibration load enormously. After the end of the runtime of the refrigerator compartment compressor 8 a time period remains before the start of the new cycle time at time A2, in which neither of the two compressors 7, 8 is operated and which can be utilized for longer compressor runtimes if conditions change when the controller is in normal mode.

The controller 2 now ascertains by way of the capturing means (not shown here) that a layer of ice has formed on both evaporators 5, 6, requiring a defrost operation. The controller therefore switches out of normal mode to a defrost mode. Therefore after the end of the runtime started at time A2 the freezer compartment compressor is heated. At time A3 the controller ascertains that the ice layer has been eliminated and the freezer compartment evaporator 7 can be operated again.

The defrost operation for the refrigerator compartment evaporator 6 is started after the end of the runtime of the refrigerator compartment compressor 8, which was started at time B2. In the exemplary sequence described here an ice layer of lesser thickness has formed on refrigerator compartment evaporator 6 than on the freezer compartment evaporator 5. The defrost operation can therefore be terminated after a shorter time likewise at time A3.

The controller ascertains in both refrigeration zones 3, 4 that the temperature has risen significantly during the defrost operation, so both compressors 7, 8 have to be activated immediately in order not to risk damage to the stored goods. Since the risk of damage in the freezer compartment 3 is estimated to be higher than in the refrigerator compartment 4, the prioritized freezer compartment compressor 7 is started up first. In order to reach the desired freezer compartment temperature again, the freezer compartment compressor would have to be operated for a time period, which is longer than the operating time before the defrost operation but when added to the similarly longer required operating time of the refrigerator compartment compressor 8 is still less than the cycle time A1/A2 provided for. In order now to be able also to lower the temperature in the refrigerator compartment 4 as promptly as possible, the freezer compartment compressor 7 is deactivated again after a short time and the refrigerator compartment compressor 8 is activated instead. However this is not operated for the full runtime required either but is likewise deactivated after a short time and the freezer compartment compressor 7 is started up again instead. This alternating starting up of the two compressors 7, 8 continues until the necessary runtime for both is reached. The controller then switches back to normal mode. Even in the defrost mode described here the compressors are never operated together despite changed conditions. Therefore high noise and vibration loads do not occur even in this mode.

A further exemplary sequence is shown with broken lines in FIG. 2 *a*) and FIG. 2 *c*). The controller 2 operates the compressors 7, 8 in normal mode until the end of the second cycle time A2/A4. At time A4 the controller however ascertains by way of the external sensor 17 that the external temperature is more than 30° C. At this external temperature the runtimes of the compressors 7, 8 would have to be extended to such a degree that the sum of the runtimes would be greater than the cycle time provided for. At this time the controller switches to a parallel mode, in which the simultaneous operation of both compressors 7, 8 is also exceptionally allowed. However the controller is structured in such a manner that the overlap of the runtimes is as small as possible even in this mode. The freezer compartment compressor 7 is therefore started up at the start of the cycle time A4. While it is still running at time B4 the refrigerator compartment compressor 8 is also activated. The time B4 is selected so that the runtime of the refrigerator compartment compressor 8 is terminated at the start of the next cycle time A5. The overlap of the two cycle times therefore only relates to the time period from the start of the runtime of the refrigerator compartment compressor 8 to the end of the runtime of the freezer compartment compressor 7. This ensures that even in extraordinary conditions the noise and vibration load is kept as low as possible and is only increased for a short time period.

In this parallel mode the controller can always switch when the sum of the runtimes of the compressors 7, 8 is about to exceed the cycle time. This does not only have to happen due to a high external temperature but can also occur when a large quantity of warm goods is introduced into the freezer compartment or refrigerator compartment at once. The controller switches to the parallel mode for a limited time period in such an instance too.

LIST OF REFERENCE CHARACTERS

1 Fridge-freezer
2 Controller
3 Freezer compartment
4 Refrigerator compartment
5 Freezer compartment evaporator
6 Refrigerator compartment evaporator
7 Freezer compartment compressor
8 Refrigerator compartment compressor
9 Freezer compartment condenser
10 Refrigerator compartment condenser
11 Line to freezer compartment compressor
12 Line to freezer compartment evaporator
13 Line to freezer compartment condenser
14 Line to refrigerator compartment compressor
15 Line to refrigerator compartment evaporator
16 Line to refrigerator compartment condenser
17 External sensor
18 Freezer compartment sensor
19 Refrigerator compartment sensor

The invention claimed is:

1. A refrigeration appliance comprising:
an interior divided into at least two refrigeration zones;
a pair of evaporators each providing cooling of a respective refrigeration zone;
a pair of compressors each supplying a respective one of the evaporators with refrigerant; and
a controller for operating the compressors, the controller performing, in dependence upon selected predetermined conditions, a controlling function in a normal mode and a controlling function in at least one other operating mode and the controller, in the normal mode, controlling the operation of the pair of compressors such that, at any given time during the normal mode, only one of the two compressors is operating and the other of the two compressors is not operating.

2. The refrigeration appliance as claimed in claim 1, wherein one of the at least two refrigeration zones is a freezer compartment and another refrigeration zone is a refrigerator compartment, and each one of the freezer compartment and the refrigerator compartment has a separate refrigerant circuit with a compressor, evaporator, and condenser.

3. The refrigeration appliance as claimed in claim 2, wherein the controller is connected to a respective temperature sensor in each of one of the freezer compartment and the refrigerator compartment.

4. The refrigeration appliance as claimed in claim 1, wherein the controller is connected to a sensor for capturing an external temperature and a limit value for the external temperature is set as a one of the selected predetermined conditions.

5. The refrigeration appliance as claimed in claim 4, wherein the controller switches out of normal mode when the external temperature exceeds a limit value of 30° C.

6. The refrigeration appliance as claimed in claim 1, wherein the sum of the relative activation periods of the compressors is set as a one of the selected predetermined conditions and the controller switches out of normal mode when the relative activation period of the compressors in total exceeds a limit value of one hundred percent (100%).

7. The refrigeration appliance as claimed in claim 1, wherein the defrost time is set as one of the selected predetermined conditions and the controller switches out of normal mode when the defrost time of an evaporator exceeds a predetermined limit value.

8. A method for controlling a refrigeration appliance, the method comprising:
in two refrigeration zones each having a respective compressor associated therewith, operating at the same time the two respective compressors associated with two refrigeration zones; and
if a conditional limit is not exceeded, operating only one of the two respective compressors and not operating the other of the two compressors.

9. The method as claimed in claim 8, wherein, when the two refrigeration zones have a simultaneous refrigeration requirement requiring operation of the associated compressors, one refrigeration zone is prioritized, and the respective compressor associated with the prioritized refrigeration zone is operated before the other compressor is operated.

10. The method as claimed in claim 9, wherein the compressor associated with the prioritized refrigeration zone is not operated for longer than a predetermined maximum changeover time and the compressor for the non-prioritized refrigeration zone is then operated.

11. A refrigeration appliance comprising:
an interior divided into at least two refrigeration zones, each refrigeration zone having a compressor to supply at least one evaporator with refrigerant,
a controller to operate the compressors, wherein the controller is operable in different operating modes as a function of one or more predetermined conditions and wherein, in a normal mode, at least two compressors are operated exclusively at different times in alternating fashion.

12. The refrigeration appliance as claimed in claim 11, wherein the at least two refrigeration zones are configured as a freezer compartment and a refrigerator compartment, with a separate refrigerant circuit with a compressor, evaporator and condenser being provided for each refrigeration zone.

13. The refrigeration appliance as claimed in claim 12, wherein the controller is connected to a temperature sensor in the freezer compartment and refrigerator compartment, respectively.

14. The refrigeration appliance as claimed in claim 11, wherein the controller is connected to a sensor for capturing external temperature and a limit value for the external temperature is set as a predetermined condition.

15. The refrigeration appliance as claimed in claim 14, wherein the controller switches out of normal mode when the external temperature exceeds the limit value of 30° C.

16. The refrigeration appliance as claimed in claim 11, wherein a sum of the relative activation periods of the compressors is set as a predefined condition and the controller switches out of normal mode when the relative activation period of the compressors in total exceeds the 100% limit.

17. The refrigeration appliance as claimed in claim 11, wherein a defrost time is set as a predetermined condition and the controller switches out of the normal mode when the defrost time of the at least one evaporator exceeds a predetermined limit value.

18. A method for controlling a refrigeration appliance with at least two refrigeration zones and two compressors, wherein the compressors are operated at different, alternating times in predetermined conditions and are operable at the same time in parallel if the respective conditional limit is exceeded.

19. The method as claimed in claim 18, wherein when the at least two refrigeration zones have a simultaneous refrigeration requirement, one refrigeration zone is prioritized and the compressor provided for the prioritized refrigeration zone is operated first.

20. The method as claimed in claim 19, wherein the compressor for the prioritized refrigeration zone is not operated for longer than a predetermined maximum changeover time and the compressor for the non-prioritized refrigeration zone is then operated.

* * * * *

UNITED STATES PATENT AND TRADEMARK OFFICE
CERTIFICATE OF CORRECTION

PATENT NO. : 8,418,498 B2
APPLICATION NO. : 12/516655
DATED : April 16, 2013
INVENTOR(S) : Hausmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

First Day of September, 2015

Michelle K. Lee
*Director of the United States Patent and Trademark Office*